(12) United States Patent
Lee et al.

(10) Patent No.: US 11,740,351 B2
(45) Date of Patent: Aug. 29, 2023

(54) ACOUSTIC METAMATERIAL AND SYSTEMS FOR EDGE DETECTION

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 388 days.

(21) Appl. No.: 17/017,831

(22) Filed: Sep. 11, 2020

(65) Prior Publication Data

US 2022/0082690 A1 Mar. 17, 2022

(51) Int. Cl.
*G01S 15/89* (2006.01)
*G01S 7/52* (2006.01)
*G10K 11/32* (2006.01)

(52) U.S. Cl.
CPC ...... *G01S 15/8906* (2013.01); *G01S 7/52079* (2013.01); *G10K 11/32* (2013.01)

(58) Field of Classification Search
None
See application file for complete search history.

(56) References Cited

U.S. PATENT DOCUMENTS 8,054,145 B2 11/2011 Mohammadi et al.
8,616,329 B1 * 12/2013 Welter .................... G10K 11/30
181/167
8,833,510 B2 9/2014 Koh et al.
9,105,791 B1 * 8/2015 Dyer .................... H01L 31/1127
9,525,944 B2 * 12/2016 Clemen, Jr. ............. G10K 15/08
(Continued)

FOREIGN PATENT DOCUMENTS

WO WO-2022136697 A1 * 6/2022

OTHER PUBLICATIONS

Molerón, Miguel, and Chiara Daraio. "Acoustic metamaterial for subwavelength edge detection." Nature communications 6.1 (2015): 1-6. (Year: 2015).*

(Continued)

*Primary Examiner* — Isam A Alsomiri
*Assistant Examiner* — Jonathan D Armstrong
(74) *Attorney, Agent, or Firm* — Christopher G. Darrow; Darrow Mustafa PC

(57) ABSTRACT

An acoustic imaging metamaterial is provided for obtaining edge detection information of a tangible object. The acoustic imaging metamaterial includes a longitudinally extending phononic crystal substrate that defines a first major surface and a second major surface opposite the first major surface. A first structurally rigid grating layer is disposed adjacent the first major surface, and a second structurally rigid grating layer is disposed adjacent the second major surface. In various aspects, the first and second structurally rigid grating layers are identical in shape and dimensions, and are aligned with one another. The acoustic imaging metamaterial is configured to redirect, confine, and/or manipulate an incident acoustic wave resulting in a high contrast image used for extracting edge detection information of the tangible object. The background medium fluid of the system can be air or a fluid such as water.

17 Claims, 7 Drawing Sheets

(56) References Cited

U.S. PATENT DOCUMENTS

| 9,858,948 | B2* | 1/2018 | Armstrong-Muntner | ............................ H04R 29/001 |
| 10,084,426 | B2 | 9/2018 | Bahr et al. | |
| 2018/0348025 | A1* | 12/2018 | Jahromi | ................. B81B 3/007 |
| 2021/0327403 | A1* | 10/2021 | Huang | .................. G02B 5/008 |

OTHER PUBLICATIONS

Zangeneh-Nejad, Farzad, and Romain Fleury. "Performing mathematical operations using high-index acoustic metamaterials." New Journal of Physics 20.7 (2018): 073001. (Year: 2018).*

Ma, Chu, Seok Kim, and Nicholas X. Fang. "Far-field acoustic subwavelength imaging and edge detection based on spatial filtering and wave vector conversion." Nature communications 10.1 (2019): 1-10. (Year: 2019).*

Ma, Chu. Metamaterials for acoustic sensing. Diss. Massachusetts Institute of Technology, 2019. (Year: 2019).*

Moleron et al., "Acoustic metamaterial for subwavelength edge detection", Nature Communications, 6: 8037 Aug. 2015, pp. 1-6.

Ma et al., "Far-field acoustic subwavelength imaging and edge detection based on spatial filtering and wave vector conversion", Nature Communications, 10: 204, Jan. 2019, pp. 1-10.

Wang et al., "Compact incoherent image differentiation with nanophotonic structures", ACS Photonics, 7, Jan. 2020, pp. 338-343.

Ge et al., "Breaking the barriers: advances in acoustic functional materials" National Science Review, vol. 5, Issue 2, Mar. 2018, pp. 159-182.

* cited by examiner

ACOUSTIC METAMATERIAL AND SYSTEMS FOR EDGE DETECTION

TECHNICAL FIELD

The present disclosure generally relates to acoustic imaging and, more particularly, to a compact system for using an acoustic metamaterial for edge detection and imaging to obtain an image or outline of an object.

BACKGROUND

The background description provided is to generally present the context of the disclosure. Work of the inventors, to the extent it may be described in this background section, and aspects of the description that may not otherwise qualify as prior art at the time of filing, are neither expressly nor impliedly admitted as prior art against the present technology.

Acoustic imaging is a non-optical imaging method that can be used to see and/or identify certain objects. With acoustic imaging, an acoustic wave passes adjacent an object and through a metamaterial, and is projected to an acoustic detector where an edge outline of the image can ultimately be extracted. Edge detection is a widely used image processing technique for use with a variety of different applications. Specifically, edge detection enables one to extract meaningful information from an image, while reducing the amount of data that needs to be processed. Current edge detection systems use complicated and/or bulky structures in order to obtain the information. Compact acoustic edge detection systems can benefit various applications, and there are many applications for autonomous vehicles that require advanced sensing technologies capable of identification of environmental objects and the like.

While compact edge detection systems have been developed using optical systems, the improvements in optical equipment do not address implementations needed for acoustic systems. Accordingly, there remains a need for more compact and improved acoustic metamaterials and acoustic imaging systems that can assist with edge detection.

SUMMARY

This section generally summarizes the disclosure and is not a comprehensive disclosure of its full scope or all its features.

In one aspect, the present technology provides an acoustic imaging metamaterial for obtaining edge detection information of a tangible object. The acoustic imaging metamaterial includes a longitudinally extending phononic crystal substrate that defines a first major surface and a second major surface opposite the first major surface. A first structurally rigid grating layer is disposed adjacent the first major surface, and a second structurally rigid grating layer is disposed adjacent the second major surface. In various aspects, the first and second structurally rigid grating layers are identical in shape and dimensions. The acoustic imaging metamaterial is configured to redirect, confine, and/or manipulate an incident acoustic wave resulting in data that can be used to create a high contrast image for extracting edge detection information of the tangible object.

In another aspect, the present technology provides an acoustic imaging system for obtaining edge detection information of a tangible object. The acoustic imaging system includes a sound transducer for emitting an incident acoustic wave in a direction toward the tangible object, and a receiver that is configured to receive the acoustic wave. An acoustic metamaterial is provided disposed between the sound transducer and the receiver. The acoustic metamaterial includes a phononic crystal substrate defining first and second opposing major surfaces. A first structurally rigid grating layer is disposed adjacent the first major surface, and a second structurally rigid grating layer is disposed adjacent the second major surface. The acoustic metamaterial is configured to redirect, confine, or manipulate the incident acoustic wave resulting in data for the receiver that can be used to create a high contrast image to extract edge detection information of the tangible object.

In others aspect, the present technology provides a method for using an acoustic imaging system for an extraction of edge detection information from a tangible object. The method includes aligning an acoustic metamaterial between a sound transducer and a receiver. In various aspects, the acoustic metamaterial includes a phononic crystal substrate defining first and second opposing major surfaces. A first structurally rigid grating layer is disposed adjacent the first major surface, a second structurally rigid grating layer is disposed adjacent the second major surface. The method includes emitting, using the sound transducer, an incident acoustic wave in a direction of the tangible object and through the acoustic metamaterial toward the receiver. The method includes permitting the acoustic metamaterial to redirect, confine, or manipulate the incident acoustic wave. Using data from the receiver, the method includes creating a high contrast image to extract edge detection information of the tangible object. In various aspects, the first structurally rigid grating layer and the second structurally rigid grating layer are provided as lamellar grating layers, and the method may include aligning each layer on the first and second opposing surfaces of the phononic crystal substrate. Each structurally rigid grating layer may define a plurality of rectangles of identical dimensions that are periodically spaced and separated by a periodical distance dimension (P) of about $0.8\lambda$, where $\lambda$ is a wavelength of the incident acoustic wave.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein.

Figure 1:
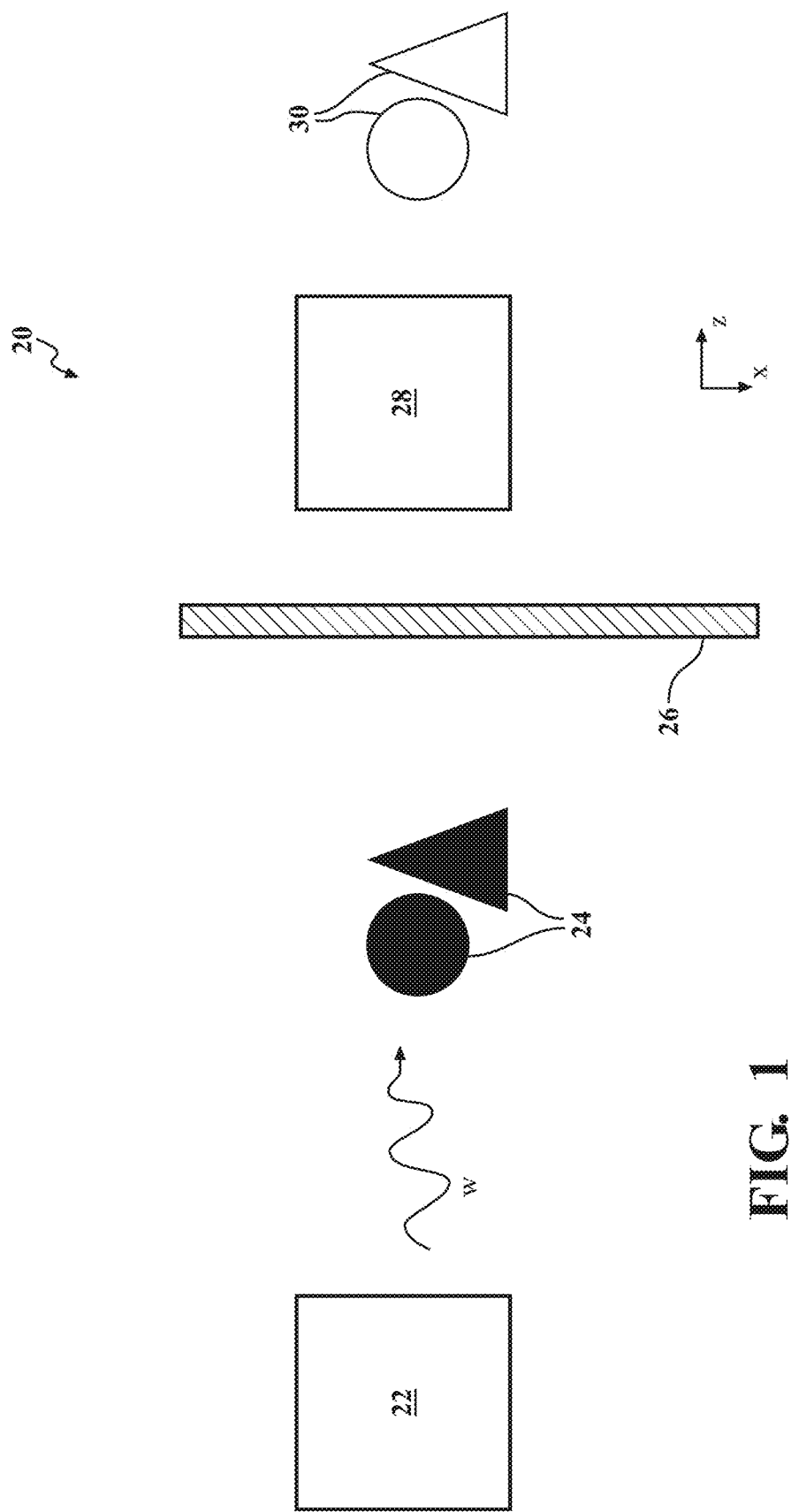
FIG. 1 is a schematic illustration that generally summarizes the basic concept of acoustic edge detection, where an acoustic wave passes adjacent tangible objects and through a transmission-type acoustic metamaterial, ultimately providing edge detection information sufficient to extract an outline of an edge of the objects.

The figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

Edge detection is an essential tool to image processing that can be used in several areas of science and technology, including automotive technology related to autonomous vehicles and the like. In broad terms, edge detection can provide a high-pass filter of an image to remove low spatial frequencies. The present technology provides improved acoustic metamaterials and acoustic imaging systems for use with edge detection of objects. As will be discussed in more detail below, the acoustic imaging system includes a sound transducer for emitting an incident acoustic wave in a direction toward the tangible object, and a receiver that is configured to receive the acoustic wave. An acoustic metamaterial is provided disposed in a location between the sound transducer and the receiver. The acoustic metamaterial includes a two-dimensional, periodic phononic crystal substrate defining first and second opposing major surfaces generally extending in a longitudinal direction. A first structurally rigid, one-dimensional grating layer is disposed adjacent the first major surface, and a second structurally rigid one-dimensional grating layer is disposed adjacent the second major surface. The acoustic metamaterial is configured to redirect, confine, or manipulate the incident acoustic wave resulting in data for the receiver to obtain and process in order to create a high contrast image and extract edge detection information of the tangible object(s).

A surface acoustic wave ("SAW") is an acoustic wave that can be caused to travel along the surface of a material. By way of a simplified example, surface acoustic waves can be formed at the surface of a piezoelectric material by the application of a suitable electrical signal to an electrode arrangement at the surface of the piezoelectric material. A suitable electrode arrangement can utilize interdigitated electrodes, where a first electrode has an arrangement of parallel electrode fingers having a regular spacing between the fingers. A corresponding second electrode of similar shape has fingers which protrude into the gaps between the fingers of the first electrode. The combination of the electrode arrangement and the piezoelectric material forms a transducer. SAW transducers are known particularly for use in frequency filters in telecommunications devices such as mobile telephones. In such a filter, there is an input transducer and an output transducer. The input signal is applied to the input transducer, to form a series of SAWs which propagate to the output transducer. At the output transducer, the SAWs are converted back into an electrical signal.

When a tangible object is illuminated by a monochromatic wave, the wave field closest to the edges of an object is dominated by acoustic surface evanescent (ASE) waves. These are waves with spatial oscillations faster than the operating wavelength, and are excited in the interface between two semi-infinite homogenous fluids with different signs of elastic parameters. A receiver device can be configured for obtaining data and generating an image using only ASE waves, and can be programmed used to visualize the edge or outer perimeter of a tangible object.

Prior acoustic metamaterials have been designed with duct shapes that transmit only components of an acoustic field that are approximately equal to or smaller than the operating wavelength. For example, the metamaterial converts ASE waves into propagative waves exciting trapped resonances, and it uses periodicity to attenuate the propagative components. That approach can achieve resolutions about 5 times smaller than the operating wavelength and makes it possible to visualize independent edges aligned along different directions. Distinct from a duct shape, the present technology proposes the use of a uniquely designed acoustic metamaterial including a 2-D phononic crystal sandwiched between structurally rigid 1-D lamellar grating layers in order to provide transmission properties that can result in data to create images having a high contrast so that edge detection information of a tangible object can more easily be obtained.

Phononic crystals can generally be defined as artificial or engineered materials made of a periodic arrangement of "scattering materials" embedded in a solid matrix. In various aspects, such scattering materials can be periodically distributed unit cells, where each unit cell has locally resonant elements with certain well-defined acoustic parameters. Their refractive index is obtained from what may be referred to as the homogenization of an infinite periodic system. Generally, due to the local resonant elements, an acoustic metamaterial including a phononic crystal may be regarded as an isotropic and homogeneous material that shows a local resonant response in a global fashion. Phononic crystals can be specifically engineered and designed with properties that are not typically found in naturally occurring materials. The band structure of phononic crystals may present, under certain conditions, absolute band gaps. For example, phononic band gaps display frequency ranges in which acoustic waves cannot propagate. In other words, there is a range of wavelengths in which elastic waves cannot propagate inside the crystal. This feature can be considered analogous to photonic band gaps for electromagnetic waves. Such systems can be applied as noise and vibration isolation, acoustic wave guiding, acoustic filters, etc. The periodic materials of phononic crystals may provide spatial modulation of elasticity, mass density, and longitudinal and transverse speed of sound.

By way of background, in a photonic crystal, it is a periodic structure that causes reflections due to scattering of incident light, thereby allowing interference between reflected light and incident light as it propagates through the photonic crystal at one or more wavelengths and angles of incidence. The photonic crystal is commonly formed of an arrangement of dielectric materials based on a regular array, such as a distributed Bragg reflector. This interference prevents propagation of light through the crystal at a certain wavelength (or range of wavelengths) and direction. Thus, there is what is referred to as a "band gap" of frequencies at which light cannot propagate through the photonic crystal. The present technology uses a phononic crystal that, by analogy, can have a periodic arrangement of discontinuities or variations in the mechanical properties of the material or materials making up the phononic crystal. As will be explained in more detail below, one non-limiting arrangement of band gap materials useful with the present technology includes periodically arranged crystals and holes in a solid matrix.

The concept of the phononic crystal has developed with elastic waves propagating in periodic structures modulated with periodic elastic moduli and mass densities. Such a phononic crystal can prevent acoustic or mechanical waves of specific wavelength from propagating through the crystal. For example, a periodic structure with an elastic modulus and mass density modulated on a scale comparable to the wavelength of acoustic waves results in phononic crystals that have band gaps, band edge states, and a slow wave effect—the ability to slow the velocity of sound. Mass density, ρ, and bulk elastic modulus, K, determine the propagation characteristics of acoustic waves in the medium. Both the sound velocity and the characteristic impedance of a medium are expressed by the speed of sound, c, and the characteristic impedance of the medium, Z, as follows:

$$c = \sqrt{K/\rho}$$

$$Z = \sqrt{K\rho}$$

In conventional materials, both the mass density and the bulk elastic modulus are positive and depend on the material composition and microstructure of the media. It is possible that negative equivalent mass density and equivalent bulk modulus can be achieved based on the resonance mechanism.

Phononic crystals can be acoustic phononic crystals with a fluid matrix, or elastic phononic materials with an elastic solid matrix. The present technology focuses with acoustic phononic crystals with innovative properties for the propagation of mechanical waves. In various aspects, the background medium fluid can be air or a fluid such as water, for the propagation of air-borne sound waves, water-borne acoustic waves, water/liquid waves, surface acoustic waves, etc. As is known to those of ordinary skill in the art, since the physics involved in the scattering process is different if the background medium is a gas (air) or a liquid (water), appropriate design changes may need to be considered for certain features of the designs disclosed herein.

Edge detection is an important part of image processing because edges can contain a major source of image information. The function of edge detection is to identify boundaries of homogeneous regions in an image based on properties such as intensity and texture. Many edge detection algorithms have been developed based on a computation of an intensity gradient vector that is sensitive to noise of the image. Gaussian edge detectors are symmetric along the edge, and reduce noise by smoothing the image. For example, in order to suppress the noise, certain spatial averaging can be combined with differentiation such as the Laplacian of Gaussian operator and the detection of zero crossing. Classically, the first stage of edge detection can be the evaluation of derivatives of the image intensity. The Laplacian of Gaussian (LOG) operator is represented as another type of edge detection operator that uses a second derivative. It finds the correct places of edges, and tests a wider area around the pixels.

FIG. 1 is a schematic illustration 20 that generally summarizes the basic concept of acoustic edge detection, where a sound transducer 22 generates an incident acoustic wave, W, which passes adjacent one or more shaped, tangible objects 24 and through a transmission-type acoustic metamaterial 26 engineered and designed in accordance with the present teachings. Since the presence of the tangible object(s) 24 influences an intensity of the acoustic wave W ultimately passing through the acoustic metamaterial 26 and to a receiver 28, an image can be extracted based on a difference in intensity, ultimately providing an outline image 30 of an edge of the tangible object(s) 24 that can be used for various purposes. Importantly, a resulting outline image 30 can be obtained without most or all of the complicated post processing steps that have previously been required by other edge detection techniques using optical or acoustic imaging.

Figure 2:
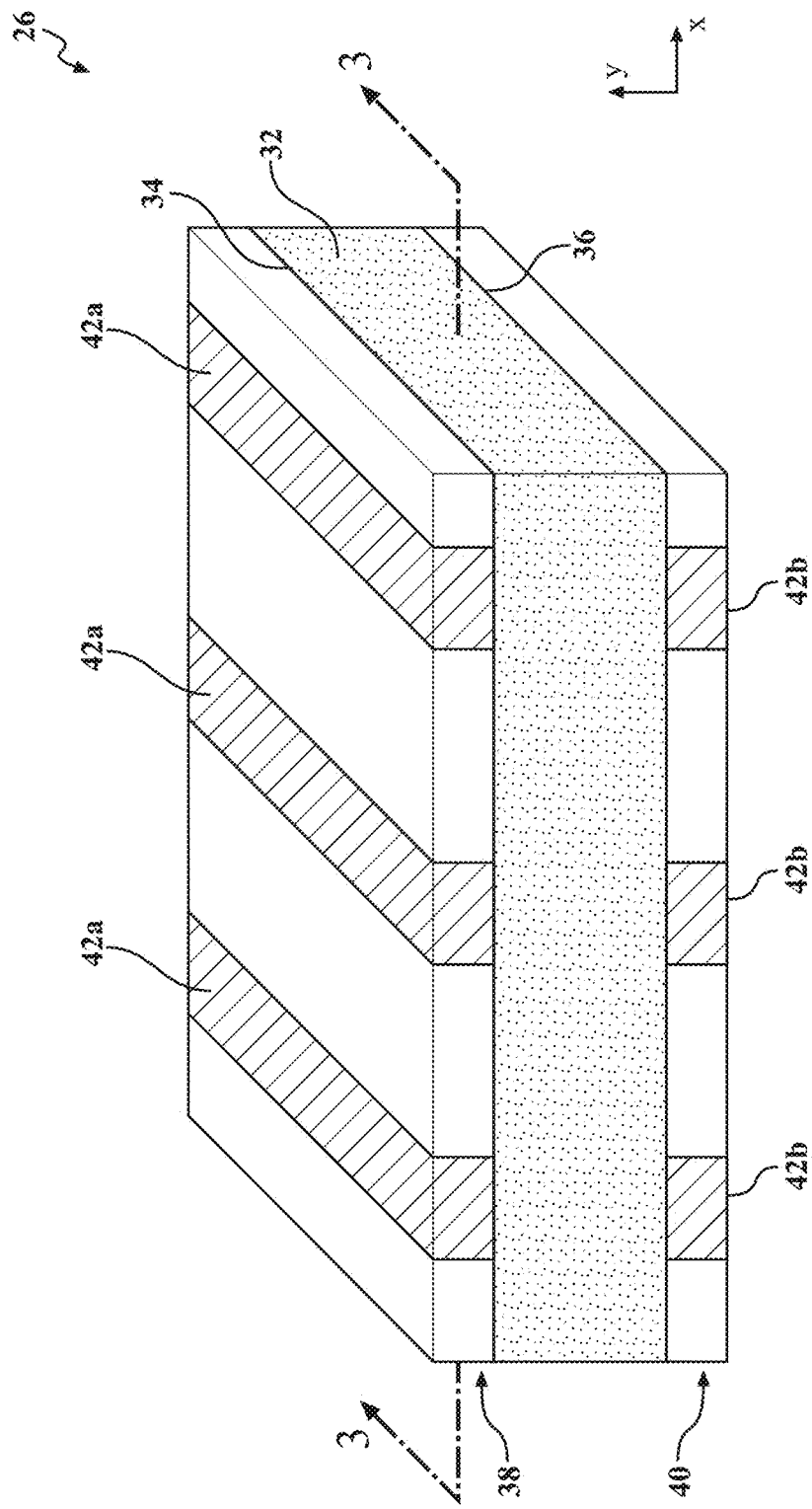
FIG. 2 is a perspective view of an exemplary acoustic metamaterial including a phononic crystal disposed between two acoustic grating layers.
Figure 3:
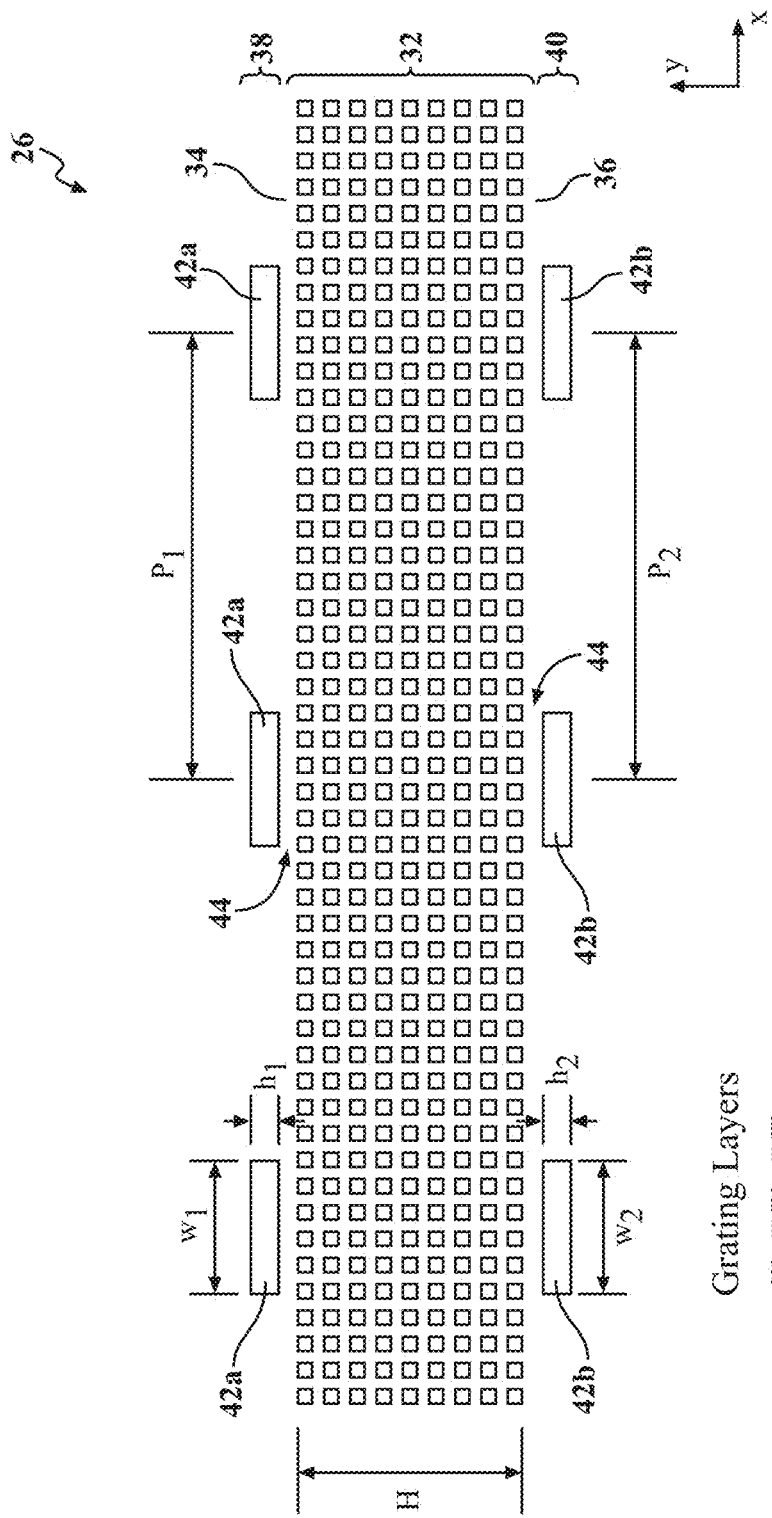
FIG. 3 is a cross-sectional view of the acoustic metamaterial structure of FIG. 2 taken along the line 3-3.

FIG. 2 illustrates a perspective view of one non-limiting example of a transmission-type acoustic metamaterial 26 for use with acoustic imaging techniques of the present technology. The acoustic imaging metamaterial is configured to redirect, confine, and/or manipulate an incident acoustic wave resulting in data that is used to create a high contrast image for extracting edge detection information of the tangible object. FIG. 3 is a cross-sectional view of the acoustic metamaterial 26 taken along the line 3-3 of FIG. 2. The acoustic metamaterial includes 26 a two-dimensional, periodic phononic crystal substrate 32 defining a first major surface 34 and a second major surface 36 opposite the first major surface 34 generally extending in a longitudinal direction. A first structurally rigid, one-dimensional grating layer 38 is disposed adjacent the first major surface 34, and a second structurally rigid one-dimensional grating layer 40 is disposed adjacent the second major surface 36.

As shown in FIGS. 2-3, the first structurally rigid grating layer 38 and the second structurally rigid grating layer 40 can be provided as what may be referred to as lamellar grating layers or structures, each defining a plurality of periodically spaced rectangular columns 42a, 42b. In various aspects, the first structurally rigid grating layer 38 and the second structurally rigid grating layer 40 have identical dimensions. It may be preferred that the first structurally rigid grating layer 38 is aligned with the second structurally rigid grating layer 40, for example, where each periodically spaced rectangular column 42a of the first grating layer 38 is aligned in the longitudinal direction with each respective periodically spaced rectangular column 42b of the second grating layer 40. In certain aspects, it may be desirable that first structurally rigid grating layer 38 is arranged with a slight offset in the longitudinal distance dimension with respect to an alignment with the second structurally rigid grating layer 40. In this instance, each periodically spaced rectangular column 42a of the first grating layer 38 is offset a distance in the longitudinal direction with each respective periodically spaced rectangular column 42b of the second grating layer 40, the shape and dimensions of the two grating layers 38, 40 would still preferably be identical.

With reference to FIG. 3, each periodically spaced rectangular column 42a of the first structurally rigid grating layer 38 has a width dimension ($w_1$) and a height dimension ($h_1$), and each periodically spaced rectangular column 42b the second structurally rigid grating layer 40 has a width dimension ($w_2$) and a height dimension ($h_2$). In various aspects, the grating layers 38, 40 will be provided with identical dimensions, such that $w_1 = w_2 = w$, and $h_1 = h_2 = h$, with an approximate relationship of $w = 3 \cdot h$. In various aspects, the longitudinally extending phononic crystal substrate 32 can be provided with a height dimension, H, having a value of about $0.4\lambda$, where $\lambda$ is the wavelength of the incident acoustic wave W. In certain aspects, the structurally rigid grating layers 38, 40 are aligned flush against the phononic crystal substrate 32. In other aspects, it may be desirable to provide a small gap 44 between one or both of the structurally rigid grating layers 38, 40 and the phononic crystal substrate 32. Such an optional gap 44 may be provided with a dimension less than or equal to the height dimension of the respective column 42a, 42b, thus between 0 and h. With respect to the periodicity of unit cells, each periodically spaced rectangular column 42a of the first structurally rigid grating layer 38 may be separated by a periodical distance dimension ($P_1$), and each periodically spaced rectangular column 42b of the second structurally rigid grating layer 40 may be separated by a periodical distance dimension ($P_2$). In most instances, $P_1=P_2=P$, such that P has a value of about 0.8λ, where λ is a wavelength of the incident acoustic wave.

In various aspects, the phononic crystal substrate 32 and the first and second structurally rigid grating layers 38, 40 can be made of any rigid material useful as an acoustic metamaterial, such as a plastic or solid that is denser than the background medium in order to provide an appropriate reflection of the acoustic wave from the structure.

Figure 4:
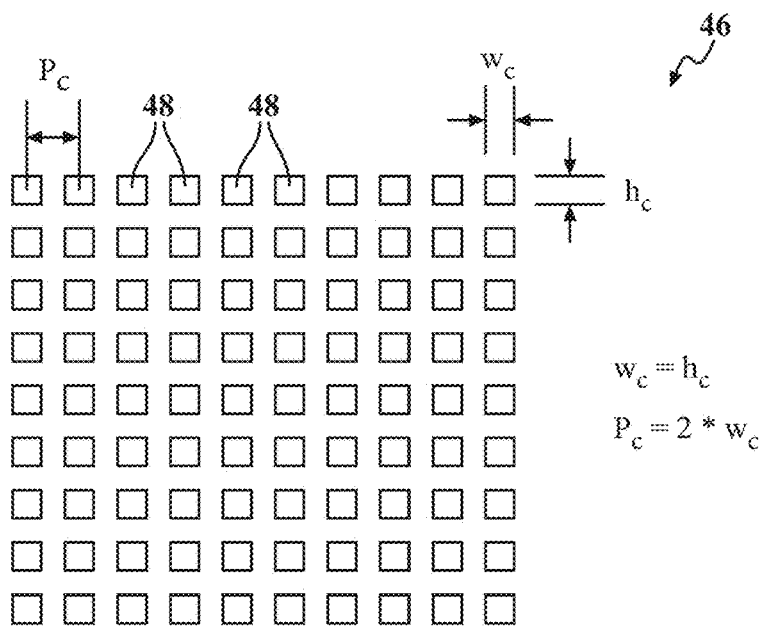
FIG. 4 illustrates an exemplary square unit cell of the acoustic metamaterial of FIGS. 2-3.
Figure 5:
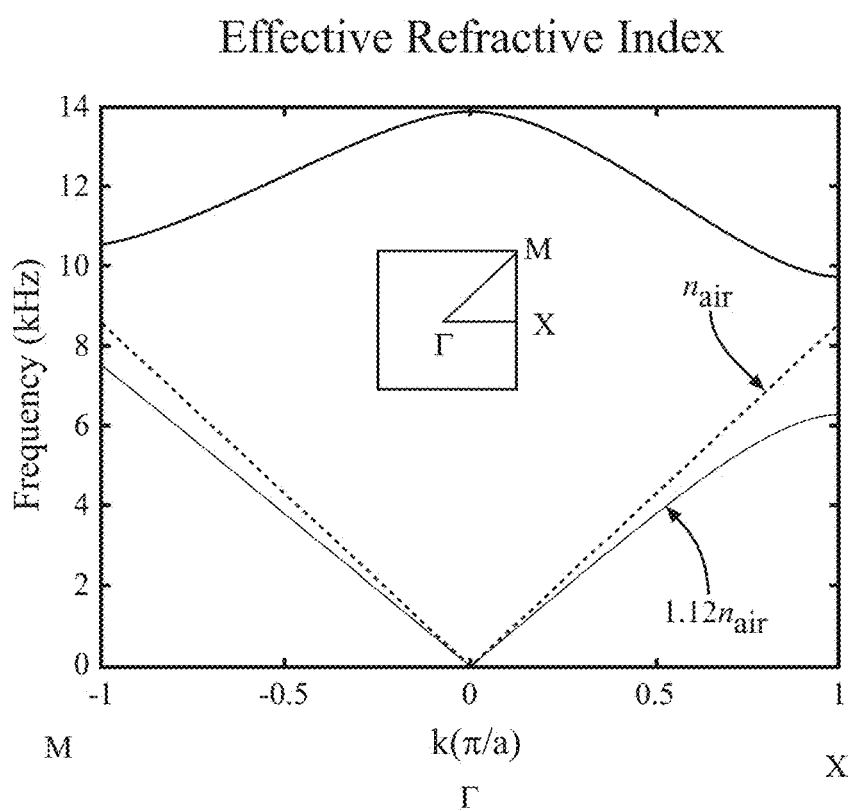
FIG. 5 illustrates a plot of effective refractive index with air as a background medium.

As is generally known in the art, phononic crystals have the lattice size about the same order of magnitude as the wavelength in the direction of sound wave propagation. Acoustic waves in phononic crystals may be reflected and scattered at the interfaces of inner and outer materials and the propagation waves, reflected waves, and scattered waves interfere, which leads to band gaps. FIG. 4 illustrates an exemplary square unit cell 46 of the acoustic metamaterial 26 of FIGS. 1-3, with a square-shaped array of individual crystals 48. As shown in FIG. 4, in various aspects, each individual crystal 48 of the square-shaped array may be provided having an equal width dimension, $w_c$, and height dimension, $h_c$, and a periodical distance dimension ($P_c$) with an approximate relationship of $P_c > 2 \cdot w_c$. The shapes and distance dimensions of the crystals and unit cells may vary based on the design and any required transmission properties. FIG. 5 illustrates a plot of effective refractive index with air as a background medium, and provides a refractive index value, n, of the material of the present technology as a multiple of 1.12 times the refractive index n of air.

In various aspects, the present technology also provides a method for using an acoustic imaging system for an extraction of edge detection information from a tangible object 24. The method includes aligning an acoustic metamaterial 26 between a sound transducer 22 and a receiver 28. The specific types of sound transducer 22 and receiver 28 may vary based on an operating frequency; non-limiting examples include an ultrasonic transducer and a microphone. As described in more detail above, the acoustic metamaterial 26 includes a phononic crystal substrate 32 defining first and second opposing major surfaces 34, 36. A first structurally rigid grating layer 38 is disposed adjacent the first major surface 34, a second structurally rigid grating layer 40 is disposed adjacent the second major surface 36. The method includes emitting, using the sound transducer 22, an incident acoustic wave W in a direction of the tangible object and through the acoustic metamaterial 26 toward the receiver 28. The method includes permitting the acoustic metamaterial 26 to redirect, confine, or manipulate the incident acoustic wave W. Using the data and information obtained from the receiver 28, the method includes creating a high contrast image to extract edge detection information of the tangible object. As is known in the art, in one non-limiting example, an examination of the mathematical operations of a Gaussian beam can be used to obtain the dimensions of the edges of the tangible object 24.

Example

Various aspects of the present disclosure are further illustrated with respect to the following Example. It is to be understood that these Example is provided to illustrate specific aspects of the present disclosure and should not be construed as limiting the scope of the present disclosure in or to any particular aspect.

Figure 6:
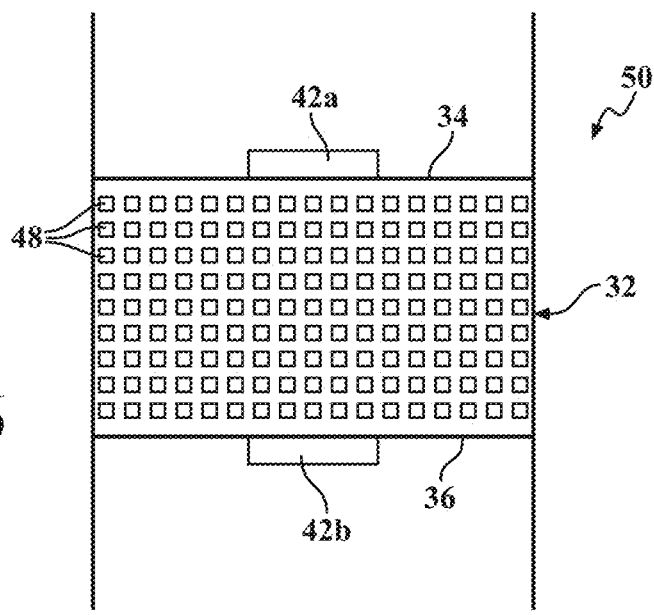
FIG. 6 illustrates simplified unit cell with periodic boundary condition that can be used with a simulation.
Figure 7:
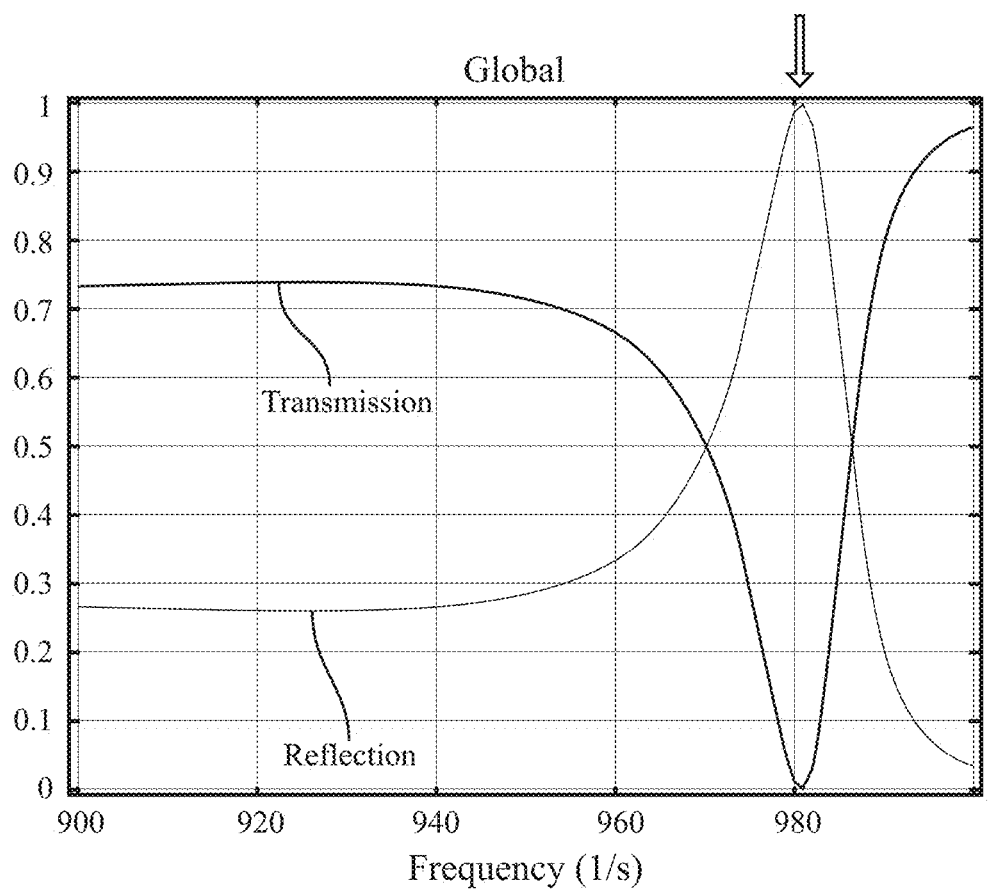
FIG. 7 illustrates a plot of reflection and transmission based on a simulation of the unit cell of FIG. 6.

FIG. 6 illustrates a simplified unit cell 50 with periodic boundary conditions used in a simulation, and FIG. 7 illustrates a plot of reflection and transmission obtained based on the periodic boundary conditions that enables one to optimize the design parameters. For the periodic boundary conditions, the pressure at the left boundary $P_L$ is related to the pressure at the right boundary $P_R$, as follows:

$$P_L = P_R \exp(-i\vec{k} \cdot \vec{P})$$

with $\vec{k}$ being the wave vector ($|\vec{k}|=2\pi/\lambda$), and $\vec{P}$ is the direction vector from the left to right boundaries (i.e., $|\vec{P}|=P_1=P_2$). The arrow indicates a sharp dip in transmission, and almost total reflection at a frequency slightly greater than 980 Hz.

Figure 8A:
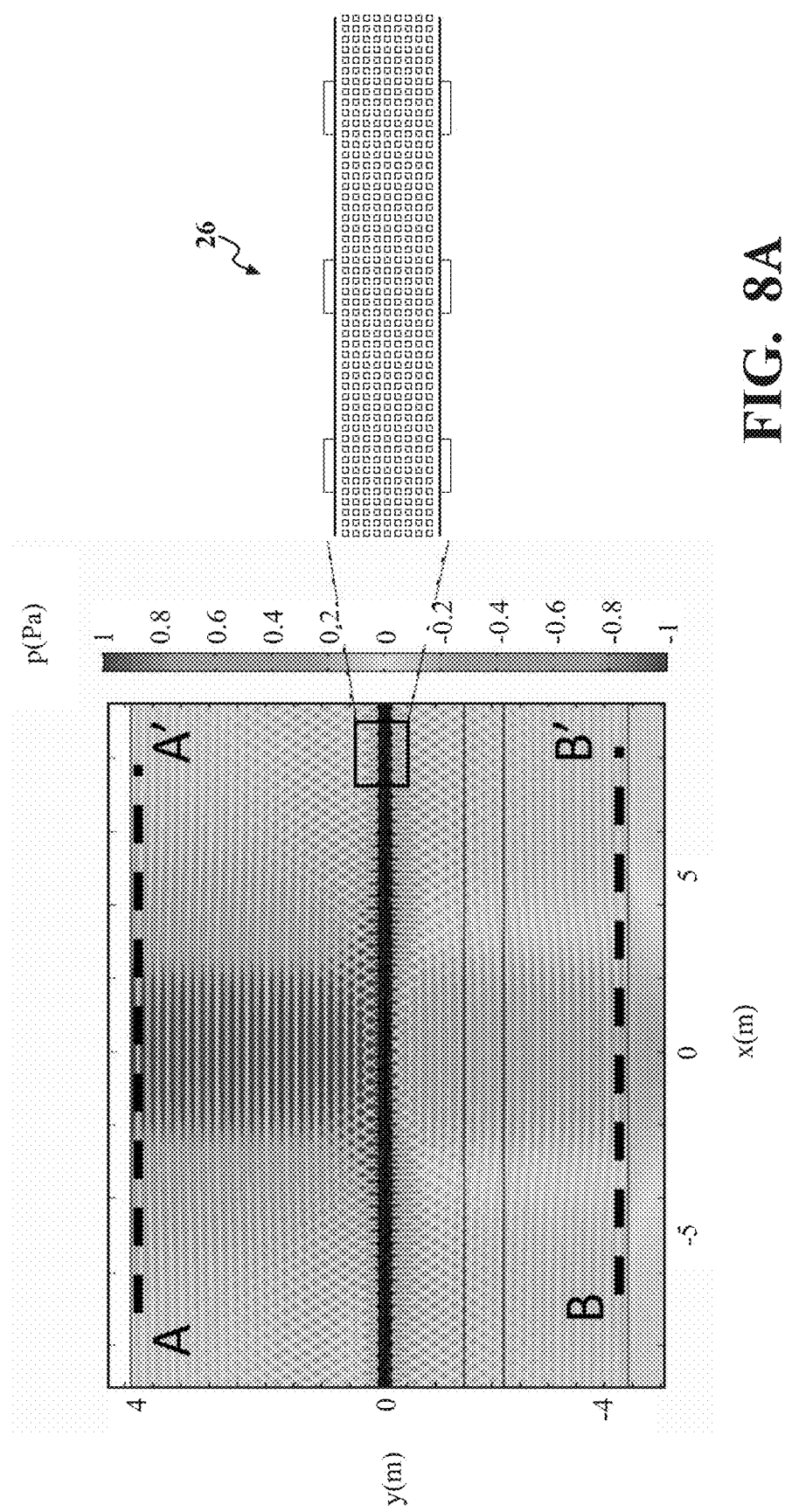
FIGS. 8A-8C provide an exemplary illustration of the analysis of edge detection information using a Gaussian beam.
Figure 8B:
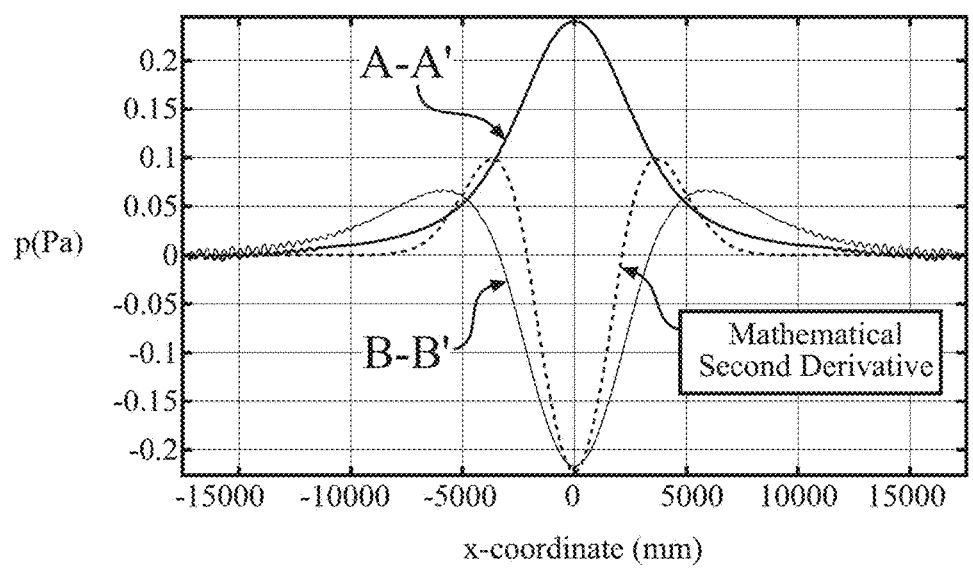
Figure 8C:
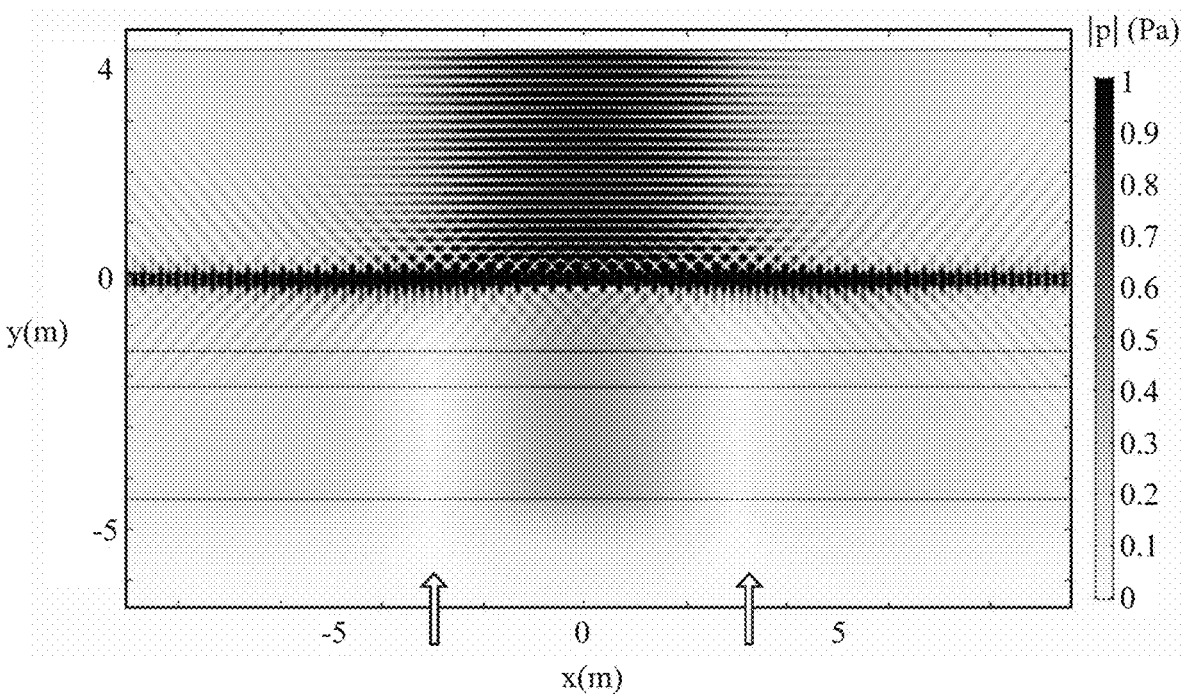

FIGS. 8A-8C provide an exemplary illustration of the analysis of edge detection information using a Gaussian beam. For example, FIG. 8A is an illustration of an exemplary intensity profile of a simulated Gaussian beam as a function of x and y, and with a pressure amplitude, p, provided in Pa. FIG. 8B illustrates the Gaussian profile comparing the A-A' and B-B' lines of FIG. 8A with the mathematical second derivative of the Gaussian equation. FIG. 8C illustrates the intensity profile similar to FIG. 8A, but using absolute pressure amplitude |p| values, with the arrows at the lower end (in the −y direction) highlighting the edge detection. In this example, the edge points of the input Gaussian beam are detected by the zero-crossing, which is labelled with the two upward arrows in FIG. 8C.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An acoustic imaging metamaterial for obtaining edge detection information of a tangible object, the acoustic imaging metamaterial comprising:
   a longitudinally extending phononic crystal substrate defining first and second opposing major surfaces;
   a first structurally rigid grating layer disposed adjacent the first major surface; and
   a second structurally rigid grating layer disposed adjacent the second major surface,
   the acoustic imaging metamaterial being configured to redirect, confine, and/or manipulate an incident acoustic wave resulting in data used to create a high contrast image for extracting edge detection information of the tangible object,
   each unit cell of the longitudinally extending phononic crystal substrate comprising a square-shaped array, with each individual crystal of the square-shaped array having an equal width dimension ($w_c$) and height dimension ($h_c$), and a periodical distance dimension ($P_c$) with a relationship of $P_c > 2 \cdot w_c$.

2. The acoustic metamaterial according to claim 1, wherein the first structurally rigid grating layer and the second structurally rigid grating layer are provided as lamellar grating layers, each defining a plurality of periodically spaced rectangular columns of identical dimensions.

3. The acoustic imaging metamaterial according to claim 2, wherein the plurality of periodically spaced rectangular columns of the first structurally rigid grating layer are aligned with the plurality of periodically spaced rectangular columns of the second structurally rigid grating layer.

4. An acoustic imaging metamaterial for obtaining edge detection information of a tangible object, the acoustic imaging metamaterial comprising:
   a longitudinally extending phononic crystal substrate defining first and second opposing major surfaces;
   a first structurally rigid grating layer disposed adjacent the first major surface; and
   a second structurally rigid grating layer disposed adjacent the second major surface,
   the acoustic imaging metamaterial being configured to redirect, confine, and/or manipulate an incident acoustic wave resulting in data used to create a high contrast image for extracting edge detection information of the tangible object,
   the first structurally rigid grating layer and the second structurally rigid grating layer being provided as lamellar grating layers, each defining a plurality of periodically spaced rectangular columns of identical dimensions,
   the plurality of periodically spaced rectangular columns of the first structurally rigid grating layer being arranged with an offset in a longitudinal distance dimension with respect to an alignment with the plurality of periodically spaced rectangular columns of the second structurally rigid grating layer.

5. An acoustic imaging metamaterial for obtaining edge detection information of a tangible object, the acoustic imaging metamaterial comprising:
   a longitudinally extending phononic crystal substrate defining first and second opposing major surfaces;
   a first structurally rigid grating layer disposed adjacent the first major surface; and
   a second structurally rigid grating layer disposed adjacent the second major surface,
   the acoustic imaging metamaterial being configured to redirect, confine, and/or manipulate an incident acoustic wave resulting in data used to create a high contrast image for extracting edge detection information of the tangible object,
   the first structurally rigid grating layer and the second structurally rigid grating layer being provided as lamellar grating layers, each defining a plurality of periodically spaced rectangular columns of identical dimensions,
   the plurality of periodically spaced rectangular columns of the first structurally rigid grating layer being aligned with the plurality of periodically spaced rectangular columns of the second structurally rigid grating layer,
   a height dimension (H) of the longitudinally extending phononic crystal substrate is about $0.4\lambda$, where $\lambda$ is a wavelength of the incident acoustic wave.

6. An acoustic imaging metamaterial for obtaining edge detection information of a tangible object, the acoustic imaging metamaterial comprising:
   a longitudinally extending phononic crystal substrate defining first and second opposing major surfaces;
   a first structurally rigid grating layer disposed adjacent the first major surface; and
   a second structurally rigid grating layer disposed adjacent the second major surface,
   the acoustic imaging metamaterial being configured to redirect, confine, and/or manipulate an incident acoustic wave resulting in data used to create a high contrast image for extracting edge detection information of the tangible object,
   the first structurally rigid grating layer and the second structurally rigid grating layer are provided as lamellar grating layers, each defining a plurality of periodically spaced rectangular columns of identical dimensions,
   a width dimension (w) of each periodically spaced rectangular column being from about $0.2\lambda$, to about $0.3\lambda$, where $\lambda$, is a wavelength of the incident acoustic wave.

7. An acoustic imaging metamaterial for obtaining edge detection information of a tangible object, the acoustic imaging metamaterial comprising:
   a longitudinally extending phononic crystal substrate defining first and second opposing major surfaces;
   a first structurally rigid grating layer disposed adjacent the first major surface; and
   a second structurally rigid grating layer disposed adjacent the second major surface, the acoustic imaging metamaterial being configured to redirect, confine, and/or manipulate an incident acoustic wave resulting in data used to create a high contrast image for extracting edge detection information of the tangible object, the first structurally rigid grating layer and the second structurally rigid grating layer being provided as lamellar grating layers, each defining a plurality of periodically spaced rectangular columns of identical dimensions, each periodically spaced rectangular column of the first structurally rigid grating layer and the second structurally rigid grating layer being separated by a periodical distance dimension (P) of about 0.8λ, where λ is a wavelength of the incident acoustic wave.

8. An acoustic imaging metamaterial for obtaining edge detection information of a tangible object, the acoustic imaging metamaterial comprising:

a longitudinally extending phononic crystal substrate defining first and second opposing major surfaces;

a first structurally rigid grating layer disposed adjacent the first major surface; and a second structurally rigid grating layer disposed adjacent the second major surface, the acoustic imaging metamaterial being configured to redirect, confine, and/or manipulate an incident acoustic wave resulting in data used to create a high contrast image for extracting edge detection information of the tangible object, the first structurally rigid grating layer and the second structurally rigid grating layer being provided as lamellar grating layers, each defining a plurality of periodically spaced rectangular columns of identical dimensions, each periodically spaced rectangular column of the first structurally rigid grating layer and the second structurally rigid grating layer has a width dimension (w) and a height dimension (h), with a relationship of w=3·h.

9. An acoustic imaging system for obtaining edge detection information of a tangible object, the acoustic imaging system comprising:

a sound transducer for emitting an incident acoustic wave in a direction toward the tangible object;

a receiver configured to receive the incident acoustic wave; and an acoustic metamaterial disposed between the sound transducer and the receiver, the acoustic metamaterial comprising:

a phononic crystal substrate defining first and second opposing major surfaces;

a first structurally rigid grating layer disposed adjacent the first major surface; and a second structurally rigid grating layer disposed adjacent the second major surface, wherein the acoustic metamaterial is configured to redirect, confine, or manipulate the incident acoustic wave resulting in a data for the receiver to use with a high contrast image to extract edge detection information of the tangible object, each unit cell of the phononic crystal substrate comprises a square-shaped array, with each individual crystal of the square-shaped array having an equal width dimension ($w_c$) and height dimension ($h_c$), and a periodical distance dimension ($P_c$) with a relationship of $P_c > 2 \cdot w_c$.

10. The acoustic imaging system according to claim 9, wherein a background medium fluid of the acoustic imaging system comprises liquid water.

11. The acoustic imaging system according to claim 9, wherein a background medium fluid of the acoustic imaging system comprises air.

12. The acoustic imaging system according to claim 9, wherein the first structurally rigid grating layer and the second structurally rigid grating layer are provided as lamellar grating layers, each defining a plurality of periodically spaced rectangular columns of identical dimensions.

13. The acoustic imaging system according to claim 12, wherein the first structurally rigid grating layer is aligned with the second structurally rigid grating layer.

14. An acoustic imaging system for obtaining edge detection information of a tangible object, the acoustic imaging system comprising:

a sound transducer for emitting an incident acoustic wave in a direction toward the tangible object;

a receiver configured to receive the incident acoustic wave; and an acoustic metamaterial disposed between the sound transducer and the receiver, the acoustic metamaterial comprising:

a phononic crystal substrate defining first and second opposing major surfaces;

a first structurally rigid grating layer disposed adjacent the first major surface; and a second structurally rigid grating layer disposed adjacent the second major surface, the acoustic metamaterial being configured to redirect, confine, or manipulate the incident acoustic wave resulting in a data for the receiver to use with a high contrast image to extract edge detection information of the tangible object, each periodically spaced rectangular column of the first structurally rigid grating layer and the second structurally rigid grating layer being separated by a periodical distance dimension (P) of about 0.8λ, where λ is a wavelength of the incident acoustic wave.

15. An acoustic imaging system for obtaining edge detection information of a tangible object, the acoustic imaging system comprising:

a sound transducer for emitting an incident acoustic wave in a direction toward the tangible object;

a receiver configured to receive the incident acoustic wave; and an acoustic metamaterial disposed between the sound transducer and the receiver, the acoustic metamaterial comprising:

a phononic crystal substrate defining first and second opposing major surfaces;

a first structurally rigid grating layer disposed adjacent the first major surface; and a second structurally rigid grating layer disposed adjacent the second major surface, the acoustic metamaterial being configured to redirect, confine, or manipulate the incident acoustic wave resulting in a data for the receiver to use with a high contrast image to extract edge detection information of the tangible object, each periodically spaced rectangle of the first structurally rigid grating layer and the second structurally rigid grating layer having a width dimension (w) and a height dimension (h), with a relationship of w=3·h.

16. A method for using an acoustic imaging system for an extraction of edge detection information from a tangible object, the method comprising:
- aligning an acoustic metamaterial between a sound transducer and a receiver, the acoustic metamaterial comprising:
  - a phononic crystal substrate defining first and second opposing major surfaces;
  - a first structurally rigid grating layer disposed adjacent the first major surface; and
  - a second structurally rigid grating layer disposed adjacent the second major surface;
- emitting, using the sound transducer, an incident acoustic wave in a direction of the tangible object and toward the receiver;
- permitting the acoustic metamaterial to redirect, confine, or manipulate the incident acoustic wave; and
- creating, using data from the receiver, a high contrast image to extract edge detection information of the tangible object,
- each unit cell of the phononic crystal substrate comprising a square-shaped array, with each crystal of the square-shaped array having an equal width dimension ($w_c$) and height dimension ($h_c$), and a periodical distance dimension ($P_c$) with a relationship of $P_c > 2 \cdot w_c$.

17. A method for using an acoustic imaging system for an extraction of edge detection information from a tangible object, the method comprising:
- aligning an acoustic metamaterial between a sound transducer and a receiver, the acoustic metamaterial comprising:
  - a phononic crystal substrate defining first and second opposing major surfaces;
  - a first structurally rigid grating layer disposed adjacent the first major surface; and
  - a second structurally rigid grating layer disposed adjacent the second major surface;
- emitting, using the sound transducer, an incident acoustic wave in a direction of the tangible object and toward the receiver;
- permitting the acoustic metamaterial to redirect, confine, or manipulate the incident acoustic wave; and
- creating, using data from the receiver, a high contrast image to extract edge detection information of the tangible object,
- the first structurally rigid grating layer and the second structurally rigid grating layer being aligned and provided as lamellar grating layers, each defining a plurality of rectangular columns of identical dimensions that are periodically spaced and separated by a periodical distance dimension (P) of about $0.8\lambda$, where $\lambda$ is a wavelength of the incident acoustic wave.

* * * * *

UNITED STATES PATENT AND TRADEMARK OFFICE
CERTIFICATE OF CORRECTION

PATENT NO. : 11,740,351 B2
APPLICATION NO. : 17/017831
DATED : August 29, 2023
INVENTOR(S) : Taehwa Lee and Hideo Iizuka It is certified that error appears in the above-identified patent and that said Letters Patent is hereby corrected as shown below:

In the Specification

Column 5, Line 20: delete "$c=\sqrt{K/\rho}$" and insert -- $c = \sqrt{K/\rho}$ --

Column 5, Line 22: delete "$Z=\sqrt{K\rho}$" and insert -- $Z = \sqrt{K\rho}$ --

In the Claims

Column 10, Lines 57-58, Claim 6: delete "from about 0.2 λ, to about 0.3 λ, where λ, is a wavelength" and insert -- from about 0.2 λ to about 0.3 λ, where λ is a wavelength --

Signed and Sealed this
Seventeenth Day of October, 2023

Katherine Kelly Vidal
*Director of the United States Patent and Trademark Office*